US012632652B2

(12) United States Patent
Denkel et al.

(10) Patent No.: US 12,632,652 B2
(45) Date of Patent: May 19, 2026

(54) MODIFYING DATA USING LARGE LANGUAGE MODELS

(71) Applicant: SAP SE, Walldorf (DE)

(72) Inventors: Christian Denkel, Joehlingen (DE); Patric Ksinsik, Puettlingen (DE)

(73) Assignee: SAP SE, Walldorf (DE)

( * ) Notice: Subject to any disclaimer, the term of this patent is extended or adjusted under 35 U.S.C. 154(b) by 161 days.

(21) Appl. No.: 18/630,727

(22) Filed: Apr. 9, 2024

(65) Prior Publication Data

US 2025/0315612 A1      Oct. 9, 2025

(51) Int. Cl.
G06F 40/20              (2020.01)

(52) U.S. Cl.
CPC .................................... G06F 40/20 (2020.01)

(58) Field of Classification Search
CPC ....................................................... G06F 40/20
See application file for complete search history.

(56) References Cited

U.S. PATENT DOCUMENTS

| | | | |
|---|---|---|---|
| 2022/0036153 A1 | 2/2022 | O'malia et al. | |
| 2024/0143296 A1* | 5/2024 | Hasabnis ................... | G06F 8/41 |
| 2024/0303440 A1* | 9/2024 | Fabian ..................... | G06F 40/18 |
| 2024/0319970 A1* | 9/2024 | Watson ..................... | G06F 8/35 |
| 2024/0338361 A1* | 10/2024 | Hazel ................. | G06F 16/2423 |
| 2024/0378399 A1* | 11/2024 | Gandhi ................... | G06F 40/40 |
| 2025/0021769 A1* | 1/2025 | Buckley ................... | G06F 8/30 |
| 2025/0094439 A1* | 3/2025 | Telling .................. | G06F 16/243 |
| 2025/0190180 A1* | 6/2025 | Ma ......................... | G06N 3/0475 |
| 2025/0217351 A1* | 7/2025 | Tan ..................... | G06F 16/2423 |
| 2025/0245425 A1* | 7/2025 | Ayed ...................... | G06F 40/284 |
| 2025/0245592 A1* | 7/2025 | Bonacci .................. | G06F 40/40 |
| 2025/0251932 A1* | 8/2025 | Hensley .................. | G06F 16/31 |

OTHER PUBLICATIONS

"European Application Serial No. 25166951.1, Extended European Search Report mailed Jul. 17, 2025", 9 pgs.
Kim, Tae Soo, "Stylette Styling the Web with Natural Language", Proceedings of the 55th ACM Technical Symposium on Computer Science Education V. 1, ACMPUB27, Apr. 27, 2022, 1-17.
Horsey, Julian, "How Does ChatGPT use Abstact Syntax Trees?", Geeky Gadgets, [Online]. Retrieved from the Internet: URL: https: https: www.geeky-gadgets.com abstract-syntax-trees , (Jul. 10, 2023), 13 pgs.
Kniazkov, Ivan, "GitHub—cqfn astranaut: Automated Abstract Syntax Tree Transformation", GitHub, Inc., [Online]. Retrieved from the Internet: URL: https: github.com cqfn astranaut, (accessed Mar. 6, 2024), 15 pgs.

(Continued)

*Primary Examiner* — Brian L Albertalli
(74) *Attorney, Agent, or Firm* — SCHWEGMAN LUNDBERG & WOESSNER, P.A.

(57) ABSTRACT

In an example embodiment, rather than send the state of the UI screen as a whole to an LLM to generate or modify one or more values on the UI screen, the identifiers and data types of data on the UI screen are gathered and sent to the LLM. The LLM is instructed to return a list of expressions that define what needs to be done to satisfy a user prompt. The calling process then evaluates the list of expressions to actually manipulate the data content.

20 Claims, 4 Drawing Sheets

100

(56)              References Cited

OTHER PUBLICATIONS

Liang, Rong, "AstBERT: Enabling Language Model for Code Understanding with Abstract Syntax Tree", DeepAI, [Online]. Retrieved from the Internet: URL: https: deepai.org publication astbert-enabling-language-model-for-code-understanding-with-abstract-syntax-tree, (Jan. 20, 2022), 6 pgs.

Sridharan, Ragav, "Summarizing source code with Abstract Syntax Trees", Medium, [Online]. Retrieved from the Internet: URL: https: https: medium.com @ragav208 summarizing-source-code-with-abstract-syntax-trees-e7a468d9966e, (Dec. 14, 2021), 14 pgs.

Yao, Wenjun, "The Metric for Automatic Code Generation Based on Dynamic Abstract Syntax Tree", International Journal of Digital Crime and Forensics, vol. 15, Issue 1. IGI Global, [Online]. Retrieved from the Internet: URL: https: www.igi-global.com pdf.aspx?tid= 325062andptid=310158andctid=4andoa=trueandisxn= 9781668479261, (2023), 1-20.

* cited by examiner

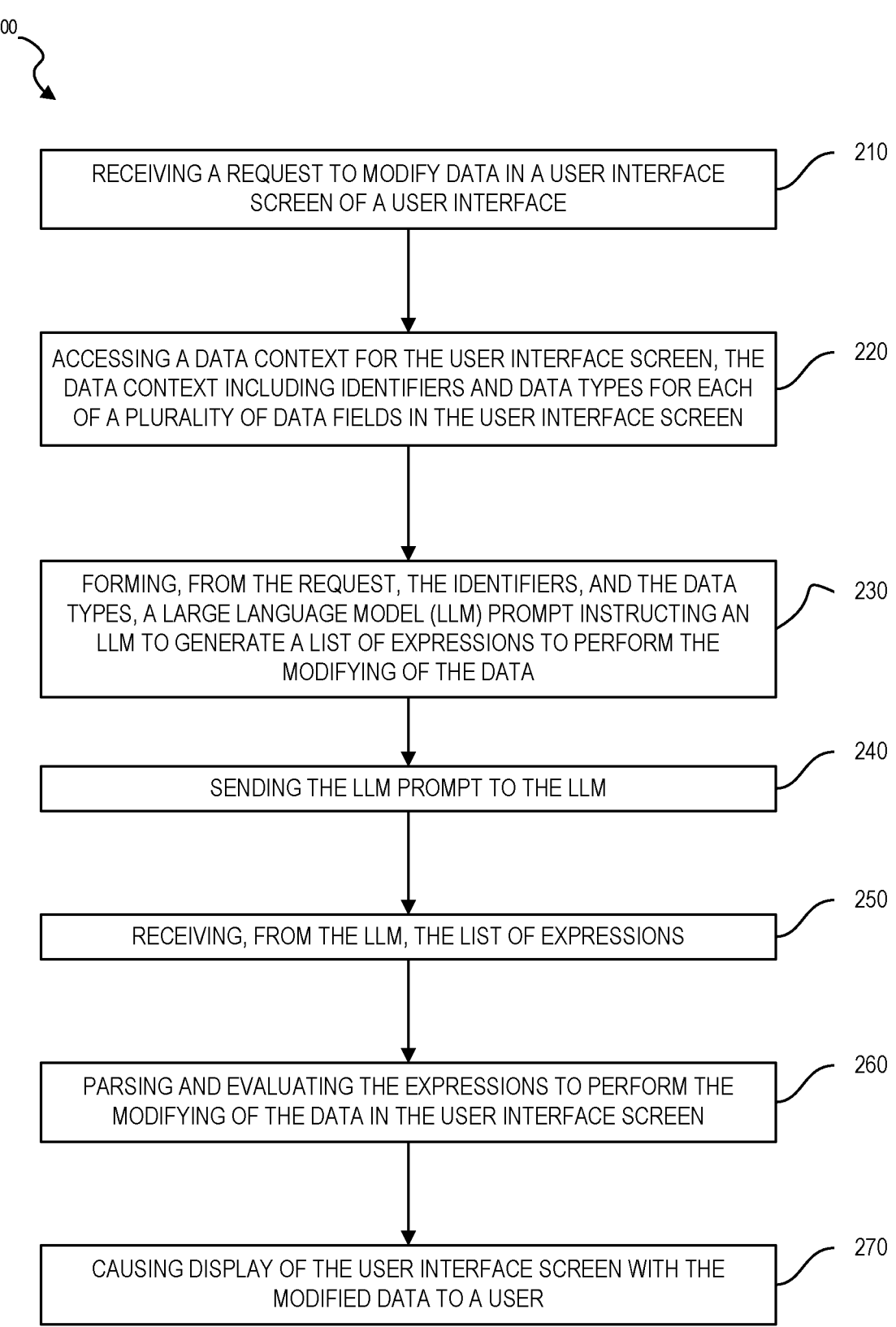

200

210
RECEIVING A REQUEST TO MODIFY DATA IN A USER INTERFACE SCREEN OF A USER INTERFACE

220
ACCESSING A DATA CONTEXT FOR THE USER INTERFACE SCREEN, THE DATA CONTEXT INCLUDING IDENTIFIERS AND DATA TYPES FOR EACH OF A PLURALITY OF DATA FIELDS IN THE USER INTERFACE SCREEN

230
FORMING, FROM THE REQUEST, THE IDENTIFIERS, AND THE DATA TYPES, A LARGE LANGUAGE MODEL (LLM) PROMPT INSTRUCTING AN LLM TO GENERATE A LIST OF EXPRESSIONS TO PERFORM THE MODIFYING OF THE DATA

240
SENDING THE LLM PROMPT TO THE LLM

250
RECEIVING, FROM THE LLM, THE LIST OF EXPRESSIONS

260
PARSING AND EVALUATING THE EXPRESSIONS TO PERFORM THE MODIFYING OF THE DATA IN THE USER INTERFACE SCREEN

270
CAUSING DISPLAY OF THE USER INTERFACE SCREEN WITH THE MODIFIED DATA TO A USER

*FIG. 2*

MODIFYING DATA USING LARGE LANGUAGE MODELS

TECHNICAL FIELD

This document generally relates to computer systems. More specifically, this document relates to use of large language models (LLMs) for modifying data.

BACKGROUND

Enterprise Resource Planning (ERP) software integrates into a single system with various processes used to run an organization, such as finance, manufacturing, human resources, supply chain, services, procurement, and others. These processes typically provide intelligence, visibility, and efficiency across most if, not all, aspects of an organization. One example of ERP software is SAP® S/4 HANA from SAP SE of Walldorf, Germany.

An LLM refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

FIG. 2 is a flow diagram illustrating a method of using an LLM to modify data of a user interface screen, in accordance with an example embodiment.

DETAILED DESCRIPTION

Figure 1:
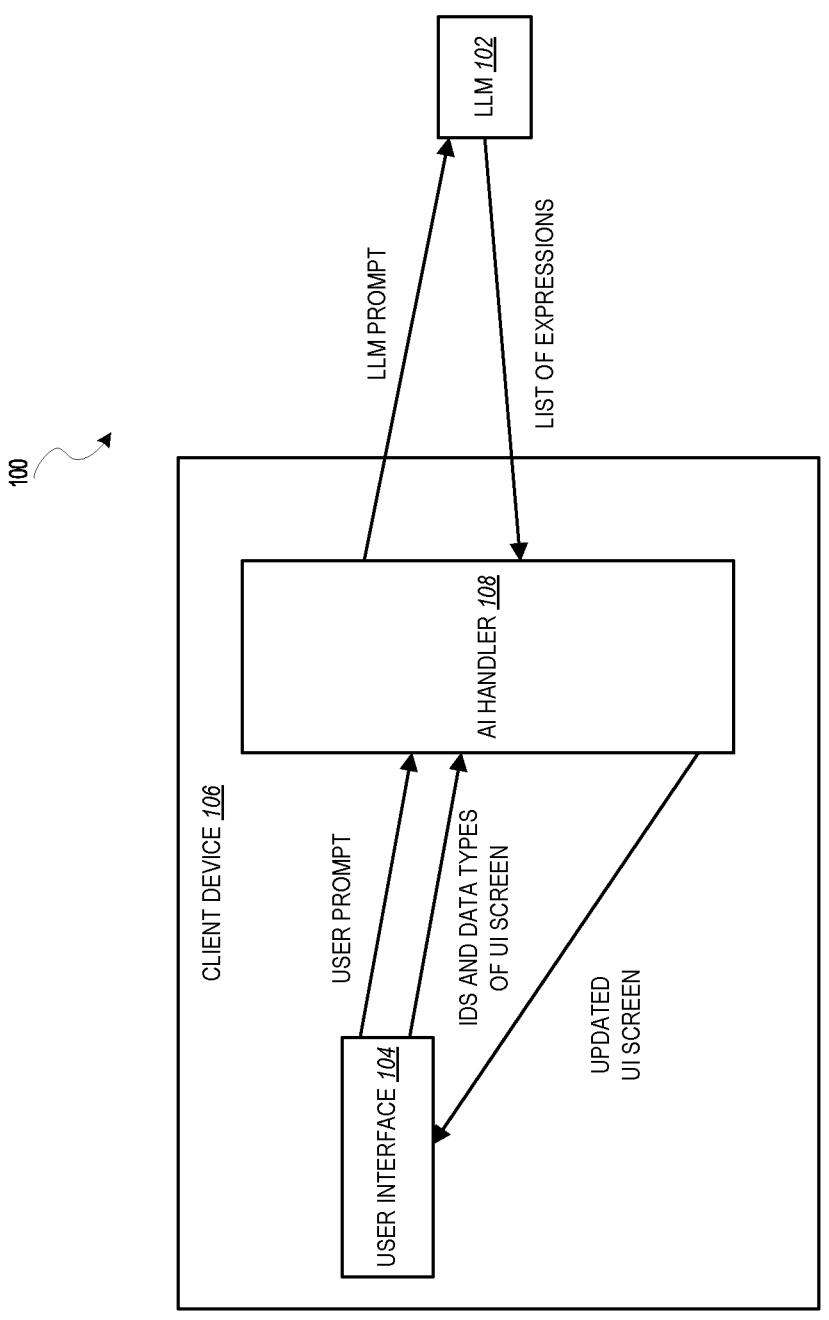
FIG. 1 is a block diagram illustrating a system for manipulating data in a user interface screen using an LLM, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In many software applications, users are able to enter data for storage or later manipulation. One example is users of an ERP system can enter data about products or transactions into an ERP client application for eventual storage in an associated database.

Various tools have been developed over the years to make data entry easier for users. All of these tools, however, still rely on the user knowing or generating the data to be entered. For example, a transaction screen may allow a user to enter a quantity for a product that was sold in the transaction.

Tools such as simple user interfaces, voice recognition, etc. can make it easier for the user to convey that, for example, 100 of the products were sold in the transaction, but these tools still require that the user actually know or derive that 100 of the products were sold during the transaction.

One solution to this would be to use artificial intelligence, and specifically a LLM, to generate the data content to be entered. In such instances, for example, the user interface could be supplied with a button that the user can select that causes the LLM to generate a value for a particular field of data. The user interface (UI) could then send the state (also known as the context) of the UI screen in which the user is entering the data to the LLM along with instructions to generate a value for the particular field. The LLM could then generate the value and return it to the UI, which could then automatically enter it into the field. A similar process could be performed to alter data already entered into a field, or to perform a mathematical operation (such as an average) on data on the screen.

There are several technical problems, however, with such an approach. First, potentially sensitive data is sent to the LLM. This can create security risks, as it may be that some of the data on the UI screen is private and should not, or even legally cannot, be shared with a third-party such as an LLM. Furthermore, data communication restrictions and restrictions on LLM input sizes (typically based on the number of pieces of input data, or tokens, entered in an LLM prompt) make this solution unworkable for scenarios where there are large amounts of data to be sent to the LLM, such as when the field in which data is to be entered or modified is part of a very large table with significant amounts of data in it. Third, with respect to mathematical operations, while LLM can perform mathematical operations, they effectiveness in doing so is substandard and their accuracy cannot be relied upon.

In an example embodiment, rather than send the state of the UI screen as a whole to an LLM to generate or modify one or more values on the UI screen, the identifiers and data types of data on the UI screen are gathered and sent to the LLM. The LLM is instructed to return a list of expressions that define what needs to be done to satisfy a user prompt. The calling process then evaluates the list of expressions to actually manipulate the data content.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. A GAN is a supervised machine learning model that has two sub-models: a generator model that is trained to generate new examples and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and the discriminator, are trained together. The generator generates a batch of samples, and these, along with real examples from the domain, are provided to the discriminator and classified as real or fake.

The discriminator is then updated to get better at discriminating real and fake samples in the next round and, importantly, the generator is updated based on how well the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with an LLM will be described.

FIG. 1 is a block diagram illustrating a system 100 for manipulating data in a user interface screen using an LLM 102, in accordance with an example embodiment. A user interface 104 operating on a client device 106 acts to display a screen in which data can be entered or manipulated. It should be noted that the term "screen" in this disclosure shall be interpreted broadly to mean any data structure that is at least partially displayed on a display of some computing device. It is not necessary that the entire screen be actually displayed at one time. For example, a UI screen could include a large 100×100 table, only 10% of which may be visible at any one time.

An artificial intelligence (AI) handler 108 on the client device 106 then obtains a list of identifiers and data types of the UI screen from the user interface 104. In some example embodiments, the list of identifiers and data types may be extracted from a JavaScript Object Notation (JSON) file associated with the UI screen.

The AI handler 108 then adds the list of identifiers and data types to a system prompt and sends the combined prompt to the LLM 102. The system prompt instructs the LLM to generate a list of expressions in an abstract syntax tree (AST) to perform a generation or modification of data in the UI screen. Notably, the LLM is not being instructed to generate or modify the data directly itself, but rather to generate a list of expressions for such a generation or modification to occur.

The list of expressions is then returned to the AI handler 108, which parses them and evaluates the expressions to modify the data in the UI screen. The modified UI screen is then passed back to the user interface 104 for display.

An AST is a tree representation of the abstract syntactic structure of source code written in a programming language. Each node of the tree denotes a construct occurring in the source code. The syntax is "abstract" in that it does not represent every detail appearing in the real syntax, but rather just the structural or content-related details. The AST includes nodes, edges, and leaves. Nodes are the basic elements of the AST. Each node represents a part of the program, such as a statement, expression, or declaration. The nodes are connected in a way that reflects the syntactical structure of the code. Edges represent the parent-child relationships between nodes. A node representing a control structure, for example, might have children nodes representing the condition and the body of that structure. The nodes that do not have any children are called leaves. They represent the most basic elements, such as identifiers, literals, or operators.

Essentially, the LLM 102 translates a "user prompt" into a list of expressions using a specific list of identifiers and their data types, as well as specific instructions included in a system prompt. The user prompt is information regarding what the user of the user interface 104 is trying to accomplish. This information may take many forms. In some example embodiments, the user may explicitly specify what they want done ("Set order to match the 1st row and the column labeled "sold" of overview"). In other example embodiments, the AI handler 108 may deduce what the user wants done based on the context, such as by pressing a button saying "automatically populate" next to a blank field that the user wants to fill in.

The following is an example of a system prompt that can be used in an example embodiment:

You need to convert the expression contained in the user's natural language input into an abstract syntax tree in JSON.

As operators in the Abstract Syntax Tree only the following are allowed:

JavaScript operators ensuring the same meaning as in JavaScript and

Math offers mathematical functions like in Math.js

The following are examples of user prompts and corresponding lists of expressions in AST form generated by LLM 102, as well as the results after parsing and processing the expressions.

1. User Prompt: Set Order to Row 1, Column Sold of Overview

Result:

```
{
  "type": "Program",
  "body": [
    {
      "type": "AssignmentExpression",
      "operator": "=",
      "left": {
        "type": "Identifier",
        "name": "Order"
      },
      "right": {
        "type": "MemberExpression",
        "object": {
          "type": "MemberExpression",
          "object": {
            "type": "Identifier",
            "name": "Overview"
          },
          "property": {
            "type": "Literal",
            "value": "Row:1"
          },
        },
        "property": {
          "type": "Identifier",
          "name": "Column:Sold"
        },
      }
    }
  ]
}
```

Which is: Order=Overview [1] [Sold]

2. User Prompt: Set 10 Percent of Stock to Order, Round

Result:

```
{
  "type": "Program",
  "body": [
    {
      "type": "AssignmentExpression",
      "operator": "=",
      "left": {
        "type": "Identifier",
        "name": "Order"
      },
      "right": {
        "type": "CallExpression",
        "callee": {
          "type": "MemberExpression",
          "object": {
            "type": "Identifier",
            "name": "Math"
          },
          "property": {
            "type": "Identifier",
            "name": "round"
          },
        },
        "arguments": [
          {
            "type": "BinaryExpression",
            "operator": "*",
            "left": {
              "type": "Identifier",
              "name": "Stock"
            },
            "right": {
              "type": "Literal",
              "value": 0.1
            }
          }
        ]
      }
    }
  ]
}
```

Which is: Order=Math.round ($Stock*0.1)

3. User Prompt: Set the Average of Column Sold to Order and Round the Result

Result:

```
{
  "type": "Program",
  "body": [
    {
      "type": "AssignmentExpression",
      "operator": "=",
      "left": {
        "type": "Identifier",
        "name": "Order"
      },
      "right": {
        "type": "CallExpression",
        "callee": {
          "type": "MemberExpression",
          "object": {
            "type": "Identifier",
            "name": "Math"
          },
          "property": {
            "type": "Identifier",
            "name": "round"
          },
        },
        "arguments": [
          {
            "type": "CallExpression",
            "callee": {
              "type": "MemberExpression",
              "object": {
                "type": "Identifier",
                "name": "Math"
```

-continued

```
            },
            "property": {
               "type": "Identifier",
               "name": "avg"
            },
         },
         "arguments": [
            {
               "type": "MemberExpression",
               "object": {
                  "type": "Identifier",
                  "name": "Overview"
               },
               "property": {
                  "type": "Identifier",
                  "name": "Column:Sold"
               },
            }
         ]
      }
   ]
      }
   }
   ]
}
```

Which is: Order=Math.round (Math.avg (Overview.Sold))

As another example, a user interface screen may contain a table of vehicle sales, with each sale having a sale identification, a name of the product sold, and a quantity. The user may wish to enter a field ("order estimate") for an estimated number of vehicles to reduce from inventory for an upcoming order and thus may indicate that the field should have a value representative of an average number of vehicles sold in each order. In that case, the user prompt may be "set order estimate to average order sold". The identifiers and data types for the user interface screen may be as follows:

Stock.type=Integer;
Order.type=Integer;
Delivery.type=Date;
Product.type=String;
Save.type=Boolean;
Cancel.type=Boolean;
Overview.type=Array [[ ], [ ]];
Overview.columns=
(["Id", "Name", "Sold"]);
Overview.columns.type=
([Integer, String, Integer]);

The LLM prompt may then cause the following list of expressions to be generated, in AST format:

```
{
   "type": "Program",
   "body": [
      {
         "arguments": [
         {
            "type": "CallExpression",
            "callee": {
               "type": "MemberExpression",
               "object": {
                  "type": "Identifier",
                  "name": "Math"
               },
               "property": {
                  "type": "Identifier",
                  "name": "avg"
               },
            },
            "arguments": [
```

-continued

```
               {
                  "type": "MemberExpression",
                  "object": {
                     "type": "Identifier",
                     "name": "Overview"
                  },
                  "property": {
                     "type": "Identifier",
                     "name": "Column:Sold"
                  }
               }
}
```

As mentioned before, the aforementioned solution enhances security by not sending any actual values of the data fields in the user interface screen to the LLM (or otherwise outside to any third party). In some example embodiments, it may be desirable to further enhance security by obscuring or otherwise hiding the actual identifiers of the data fields. This may be accomplished by, for example, replacing some or all of the identifiers with dummy identifiers. Thus, for example, The UI element "Stock.type=String" which indicates a field identifier of "Stock" has a type of "String" can be replaced with "A.type=String" prior to its inclusion in the LLM prompt. When the list of expressions is received from the LLM and eventually parsed and processed, the dummy identifier "A" in the list of expressions can be replaced with the actual identifier "Stock," therefore preserving the privacy of the data field identifier.

FIG. 2 is a flow diagram illustrating a method 200 of using an LLM to modify data of a user interface screen, in accordance with an example embodiment. Step 210 comprises receiving a request to modify data in a user interface screen of a user interface. Step 220 comprises accessing a data context for the user interface screen, the data context including identifiers and data types for each of a plurality of data fields in the user interface screen. Step 230 comprises forming, from the request, the identifiers, and the data types, a Large Language Model (LLM) prompt instructing an LLM to generate a list of expressions to perform the modifying of the data.

Step 240 comprises sending the LLM prompt to the LLM. Step 250 comprises receiving, from the LLM, the list of expressions. Step 260 comprises parsing and evaluating the expressions to perform the modifying of the data in the user interface screen. Step 270 comprises causing display of the user interface screen with the modified data to a user.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: receiving a request to modify data in a user interface screen of a user interface; accessing a data context for the user interface screen, the data context including identifiers and data types for each of a plurality of data fields in the user interface screen; forming, from the request, the identifiers, and the data types, a Large Language Model (LLM) prompt instructing an LLM to generate a list of expressions to perform the modifying of the data; sending the LLM prompt to the LLM; receiving, from the LLM, the list of expressions; parsing and evaluating the expressions to perform the modifying of the data in the user interface screen; and causing display of the user interface screen with the modified data to a user.

In Example 2, the subject matter of Example 1 includes, wherein values contained in the plurality of data fields are not sent to the LLM.

In Example 3, the subject matter of Examples 1-2 includes, wherein the list of expressions is in Abstract Syntax Tree (AST) format.

In Example 4, the subject matter of Examples 1-3 includes, wherein the forming comprises adding a system prompt to the request, the identifiers, and the data types.

In Example 5, the subject matter of Examples 1-4 includes, wherein the request is an explicit request from a user received via input by a user in the user interface.

In Example 6, the subject matter of Examples 1-5 includes, wherein the request is inferred based on a user action within the user interface and based on the data context.

In Example 7, the subject matter of Examples 1-6 includes, wherein the operations are performed on an artificial intelligence handler on a client device also containing the user interface.

Example 8 is a method comprising: receiving a request to modify data in a user interface screen of a user interface; accessing a data context for the user interface screen, the data context including identifiers and data types for each of a plurality of data fields in the user interface screen; forming, from the request, the identifiers, and the data types, a Large Language Model (LLM) prompt instructing an LLM to generate a list of expressions to perform the modifying of the data; sending the LLM prompt to the LLM; receiving, from the LLM, the list of expressions; parsing and evaluating the expressions to perform the modifying of the data in the user interface screen; and causing display of the user interface screen with the modified data to a user.

In Example 9, the subject matter of Example 8 includes, wherein values contained in the plurality of data fields are not sent to the LLM.

In Example 10, the subject matter of Examples 8-9 includes, wherein the list of expressions is in Abstract Syntax Tree (AST) format.

In Example 11, the subject matter of Examples 8-10 includes, wherein the forming comprises adding a system prompt to the request, the identifiers, and the data types.

In Example 12, the subject matter of Examples 8-11 includes, wherein the request is an explicit request from a user received via input by a user in the user interface.

In Example 13, the subject matter of Examples 8-12 includes, wherein the request is inferred based on a user action within the user interface and based on the data context.

In Example 14, the subject matter of Examples 8-13 includes, wherein the method is performed on an artificial intelligence handler on a client device also containing the user interface.

Example 15 is a non-transitory machine-readable medium storing instructions which, when executed by one or more processors, cause the one or more processors to perform operations comprising: receiving a request to modify data in a user interface screen of a user interface; accessing a data context for the user interface screen, the data context including identifiers and data types for each of a plurality of data fields in the user interface screen; forming, from the request, the identifiers, and the data types, a Large Language Model (LLM) prompt instructing an LLM to generate a list of expressions to perform the modifying of the data; sending the LLM prompt to the LLM; receiving, from the LLM, the list of expressions; parsing and evaluating the expressions to perform the modifying of the data in the user interface screen; and causing display of the user interface screen with the modified data to a user.

In Example 16, the subject matter of Example 15 includes, wherein values contained in the plurality of data fields are not sent to the LLM.

In Example 17, the subject matter of Examples 15-16 includes, wherein the list of expressions is in Abstract Syntax Tree (AST) format.

In Example 18, the subject matter of Examples 15-17 includes, wherein the forming comprises adding a system prompt to the request, the identifiers, and the data types.

In Example 19, the subject matter of Examples 15-18 includes, wherein the request is an explicit request from a user received via input by a user in the user interface.

In Example 20, the subject matter of Examples 15-19 includes, wherein the request is inferred based on a user action within the user interface and based on the data context.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 3:
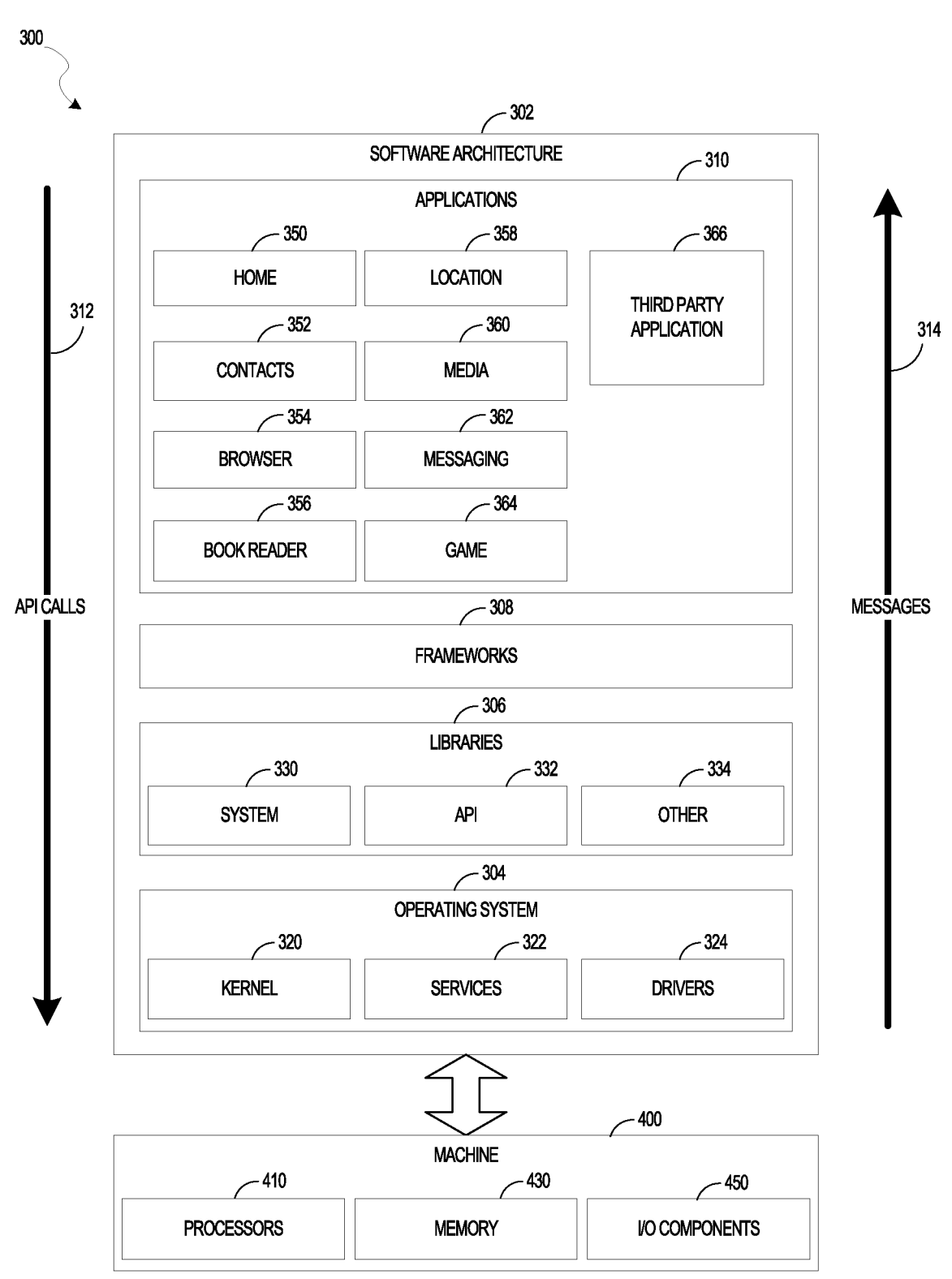
FIG. 3 is a block diagram illustrating an architecture of software, which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various graphical user interface functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
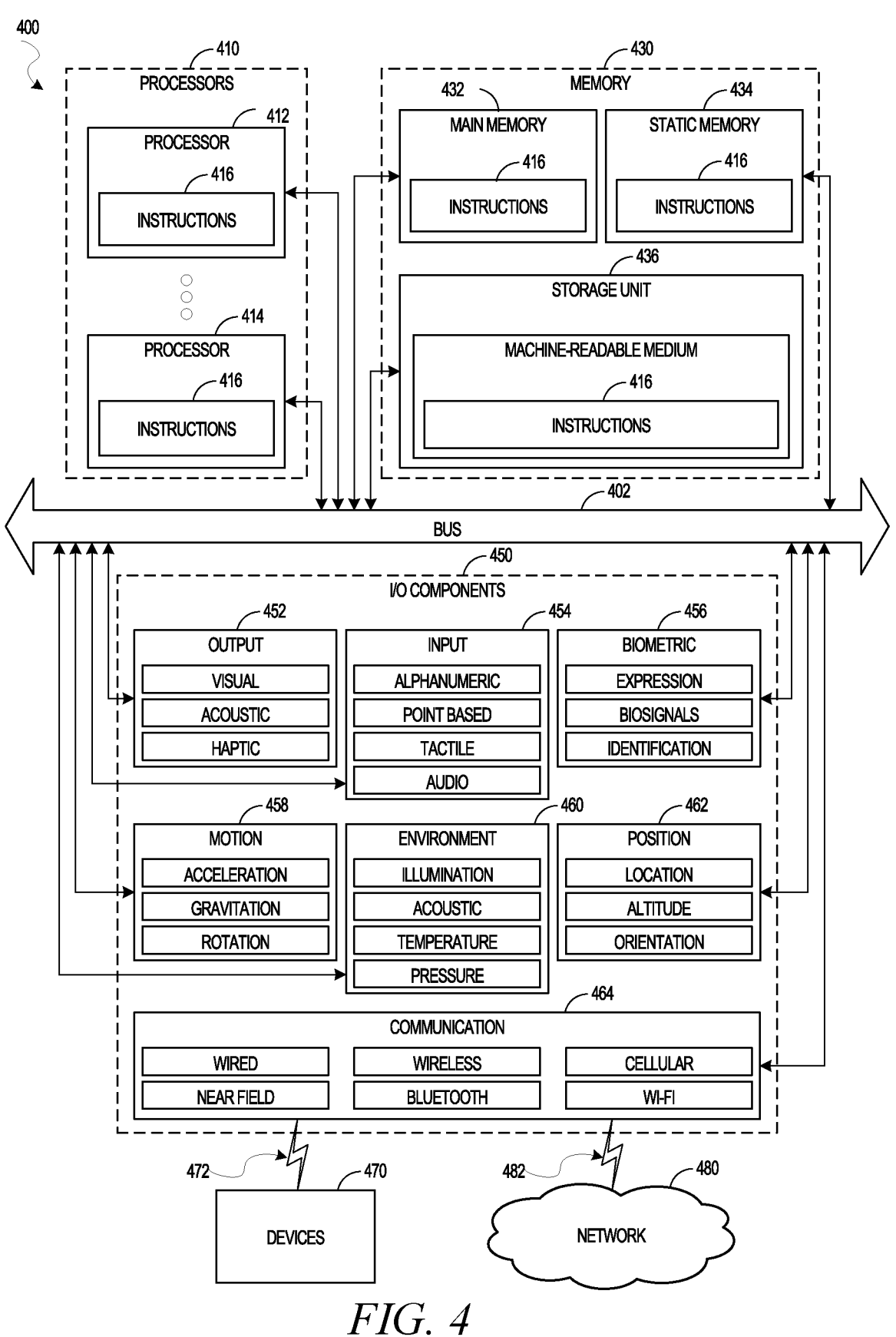
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method 200 of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel (PDP), a light-emitting diode (LED) display, a liquid crystal display (LCD), a projector, or a cathode ray tube [CRT]), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

receiving a request to modify a first field of a plurality of fields displayed in a user interface screen of a user interface, at least some of the plurality of fields containing data having data values, the data values having corresponding data identifiers and data types;

forming, from the request, the identifiers, and the data types, but not from the data values, a Large Language Model (LLM) prompt instructing an LLM to generate a list of expressions to perform the modifying of the first field;

sending the LLM prompt to the LLM without sending the data values themselves to the LLM;

receiving, from the LLM, the list of expressions;

parsing and evaluating the expressions to perform the modifying of the first field; in the user interface screen; and causing display of the user interface screen with the modified first field; to a user.

2. The system of claim 1, wherein the list of expressions is in Abstract Syntax Tree (AST) format.

3. The system of claim 1, wherein the forming comprises adding a system prompt to the request, the identifiers, and the data types.

4. The system of claim 1, wherein the request is an explicit request from the user received via input by the user in the user interface.

5. The system of claim 1, wherein the request is inferred based on a user action within the user interface.

6. The system of claim 1, wherein the operations are performed on an artificial intelligence handler on a client device also containing the user interface.

7. A method comprising:

receiving a request to modify a first field of a plurality of fields displayed in a user interface screen of a user interface, at least some of the plurality of fields containing data having data values, the data values having corresponding data identifiers and data types;

forming, from the request, the identifiers, and the data types, but not from the data values, a Large Language Model (LLM) prompt instructing an LLM to generate a list of expressions to perform the modifying of the first field;

sending the LLM prompt to the LLM without sending the data values themselves to the LLM;

receiving, from the LLM, the list of expressions;

parsing and evaluating the expressions to perform the modifying of the first field; in the user interface screen; and causing display of the user interface screen with the modified first field; to a user.

8. The system of claim 1, wherein the forming further comprises:

replacing at least some of the data identifiers with dummy identifiers prior to inclusion in the LLM prompt, such that the LLM prompt sent to the LLM contains the dummy identifiers in place of the at least some of the data identifiers; and wherein the parsing and evaluating of the expressions comprises replacing the dummy identifiers in the expressions received from the LLM with corresponding ones of the data identifiers.

9. The method of claim 7, wherein the list of expressions is in Abstract Syntax Tree (AST) format.

10. The method of claim 7, wherein the forming comprises adding a system prompt to the request, the identifiers, and the data types.

11. The method of claim 7, wherein the request is an explicit request from the user received via input by the user in the user interface.

12. The method of claim 7, wherein the request is inferred based on a user action within the user interface.

13. The method of claim 7, wherein the method is performed on an artificial intelligence handler on a client device also containing the user interface.

14. A non-transitory machine-readable medium storing instructions which, when executed by one or more processors, cause the one or more processors to perform operations comprising:

receiving a request to modify a first field of a plurality of fields displayed in a user interface screen of a user interface, at least some of the plurality of fields containing data having data values, the data values having corresponding data identifiers and data types;

forming, from the request, the identifiers, and the data types, but not from the data values, a Large Language Model (LLM) prompt instructing an LLM to generate a list of expressions to perform the modifying of the first field;

sending the LLM prompt to the LLM without sending the data values themselves to the LLM;

receiving, from the LLM, the list of expressions;

parsing and evaluating the expressions to perform the modifying of the first field; in the user interface screen; and causing display of the user interface screen with the modified first field; to a user.

15. The method of claim 7, wherein the forming further comprises:

replacing at least some of the data identifiers with dummy identifiers prior to inclusion in the LLM prompt, such that the LLM prompt sent to the LLM contains the dummy identifiers in place of the at least some of the data identifiers; and wherein the parsing and evaluating of the expressions comprises replacing the dummy identifiers in the expressions received from the LLM with corresponding ones of the data identifiers.

16. The non-transitory machine-readable medium of claim 14, wherein the list of expressions is in Abstract Syntax Tree (AST) format.

17. The non-transitory machine-readable medium of claim 14, wherein the forming comprises adding a system prompt to the request, the identifiers, and the data types.

18. The non-transitory machine-readable medium of claim 14, wherein the request is inferred based on a user action within the user interface.

19. The non-transitory machine-readable medium of claim 14, wherein the request is an explicit request from the user received via input by the user in the user interface.

20. The non-transitory machine-readable medium of claim 14, wherein the forming further comprises:

replacing at least some of the data identifiers with dummy identifiers prior to inclusion in the LLM prompt, such that the LLM prompt sent to the LLM contains the dummy identifiers in place of the at least some of the data identifiers; and wherein the parsing and evaluating of the expressions comprises replacing the dummy identifiers in the expressions received from the LLM with corresponding ones of the data identifiers.

* * * * *